United States Patent [19]

Sawaragi

[11] Patent Number: 5,367,019
[45] Date of Patent: Nov. 22, 1994

[54] COATING COMPOSITION AND ARTICLE COATED THEREBY

[75] Inventor: Fujio Sawaragi, Kanagawa, Japan

[73] Assignee: Nippon Arc Co., Ltd., Japan

[21] Appl. No.: 189,737

[22] Filed: Feb. 1, 1994

Related U.S. Application Data

[60] Division of Ser. No. 938,526, Sep. 2, 1992, Pat. No. 5,314,947, which is a continuation of Ser. No. 703,816, May 21, 1991, abandoned.

[30] Foreign Application Priority Data

Jun. 11, 1990 [JP] Japan ................................. 2-152356
Mar. 22, 1991 [JP] Japan ................................... 3-58749

[51] Int. Cl.$^5$ ........................... C08K 3/10; B32B 9/04
[52] U.S. Cl. .................................... 524/780; 524/783; 524/784; 524/868; 528/26; 528/32; 528/38; 528/30; 528/42; 106/287.16; 106/287.14; 106/287.13; 428/413; 428/447
[58] Field of Search ............... 524/780, 783, 784, 868; 528/26, 32, 38, 30, 42; 106/287.16, 287.14, 287.13; 428/447, 413

[56] References Cited

U.S. PATENT DOCUMENTS

| | | | |
|---|---|---|---|
| 4,338,375 | 7/1982 | Hashimoto et al. | 428/412 |
| 4,500,669 | 2/1985 | Ashlock et al. | 524/440 |
| 4,571,365 | 2/1986 | Ashlock et al. | 428/412 |
| 4,680,232 | 7/1987 | Factor et al. | 428/412 |
| 4,702,773 | 10/1987 | Ashlock et al. | 106/287.12 |
| 5,013,788 | 5/1991 | Nagashima et al. | 524/767 |
| 5,021,091 | 6/1991 | Takarada et al. | 106/287.16 |

FOREIGN PATENT DOCUMENTS 2108985  5/1983  United Kingdom .

Primary Examiner—Melvyn I. Marquis
Assistant Examiner—Karen A. Dean
Attorney, Agent, or Firm—Lorusso & Loud

[57] ABSTRACT

A coating composition capable of forming a transparent coating having a high refractive index, excellent dyeing properties and scratch resistance on a transparent solid material, the coating composition comprising:

(A) 100 parts by weight of an epoxy group-containing silicon compound or a partial hydrolysis product thereof, (B) 0 to 100 parts by weight of an organosilicon compound or a partial hydrolysis product thereof, (C) a metal oxide sol containing 0 to 130 parts by weight of at least one metal oxide selected from the group consisting of antimony oxide, tin oxide and titanium oxide, (D) 0.25 to 30 parts by weight of a polybasic carboxylic acid or an acid anhydride thereof, or a bisphenol compound, and (E) 0.01 to 30 parts by weight of a curing catalyst, or a molded article formed by coating a transparent solid material with the above coating composition as a coating layer-forming component.

5 Claims, No Drawings

COATING COMPOSITION AND ARTICLE COATED THEREBY

CROSS-REFERENCE TO RELATED APPLICATIONS

The present application is a division of co-pending application U.S. Ser. No. 07/938,526, filed Sep. 2, 1991, now U.S. Pat. No. 5,314,947, which in turn, is a continuation of U.S. application Ser. No. 07/703,816, filed May 21, 1991, now abandoned.

BACKGROUND OF THE INVENTION

1. Field of the Invention

The present invention relates to a composition which forms a highly scratch-resistant and transparent coating having a high refractive index on a surface of a transparent solid material, and in particular, it relates to a transparent coating composition for use on a plastic lens.

2. Related Art

A plastic material is utilized as a transparent solid substitute for glass due to its light weight and excellent processability. Since, however, the plastic material is softer than glass, it is easily scratched. It is therefore known to form a transparent coating layer on a surface of a transparent solid material such as a transparent plastic material, or the like, in order to protect the surface of said transparent solid material and impart the surface with wear resistance. For example, Japanese Patent Publication No. 37142/1988 discloses a method of coating on a transparent solid material with a metal oxide such as antimony oxide, or the like and an organosilicon polymer, and Japanese Patent Publication No. 56093/1989 discloses a method of coating a transparent solid material with antimony oxide or aluminum acetate and a partial condensate of organosilicon.

Japanese Patent Publication Tokkai No. 80359/1983 discloses a coating composition for use on a transparent solid material, which is obtained by adding alkyl, a vinyl or phenylsilanol partial condensate, a partial condensate of epoxy-based silanol and a crosslinking agent selected from polyfunctional carboxylic acid, a polyfunctional carboxylic acid anhydride and polyfunctional imide to colloidal silica.

Further, Japanese Patent Publication Tokkai No. 306477/1989 discloses a coating composition for use on a transparent solid material, which comprises antimony oxide, alumina sol, titania sol, etc., and epoxy group-containing silane, etc.

When the coating composition disclosed in any of the above prior arts is coated on a transparent glass or plastic material having a high refractive index, interference fringes are observed due to a slight nonuniformity in the thickness of the coating layer when light is reflected, since the refractive index of the coating layer is relatively low. In particular, when the above transparent solid material is a lens for spectacles, the lens appearance is impaired and such a lens has no commercial value.

The coating layers obtained by the above prior art cannot be said to be excellent in dyeing properties. When a transparent solid material having such a coating layer is applied to sunglasses or window glass, therefore, there have been cases where the coating layer cannot be dyed with a conventional dye.

SUMMARY OF THE INVENTION

It is an object of the present invention to provide a coating composition which can form a transparent coating layer having a high refractive index, excellent dyeing properties and high scratch resistance, on a transparent solid material.

DETAILED DESCRIPTION OF THE INVENTION

The above object is achieved by the following scratch-resistant coating composition including the following components;

(A) 100 parts by weight of an epoxy group-containing silicon compound of the general formula

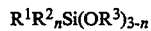

$$R^1R^2{}_n Si(OR^3)_{3-n}$$

wherein $R^1$ is an epoxy group-containing group having 2 to 12 carbon atoms, $R^2$ is an alkyl, alkenyl or halogenated alkyl group having 1 to 6 carbon atoms or a halogenated aryl group, $R^3$ is a hydrogen atom or an alkyl, acyl or alkylacyl group having 1 to 4 carbon atoms, and n is an integer of 0 to 2, or a partial hydrolysis product thereof, (B) 0 to 100 parts by weight of an organosilicon compound of general formula

$$R^4{}_p R^2{}_q Si(OR^3)_{4-p-q}$$

wherein $R^2$ and $R^3$ are as defined in (A), $R^4$ is an alkyl or halogenated alkyl group having 1 to 4 carbon atoms, an aryl or halogenated aryl group having 6 to 12 carbon atoms, a methacryloxyalkylene group having 5 to 8 carbon atoms, a ureidoalkylene, an aromatic ureidoalkylene, or a halogenated aromatic alkylene or mercaptoalkylene group having 2 to 10 carbon atoms, p is an integer of 1 to 3 and q is an integer of 0 to 2, or a partial hydrolysis product thereof, (C) a metal oxide sol containing 0 to 130 parts by weight of at least one metal oxide selected from the group consisting of antimony oxide, tin oxide and titanium oxide, (D) 0.25 to 30 parts by weight of a polybasic carboxylic acid or an anhydride thereof, or a bisphenol compound, and (E) 0.01 to 30 parts by weight of a curing catalyst.

The epoxy group-containing silicon compound or the partial hydrolysis product thereof as (A) component in the present invention is used to impart surface hardness. The (A) component can give a cured coating having a high refractive index due to the presence of an epoxy group.

The amount of the (A) components is 100 parts by weight. In addition, the amounts of the following (B) to (H) components are based on 100 parts by weight of the (A) component.

The organosilicon compound as (B) component is used to achieve improved surface hardness of the cured coating, as is the (A) component. However, the (B) component is not essential in the present invention. As an organosilicon compound, the (A) component is sufficient to form a cured coating even when used alone. The amount of the (B) component is 0 to 100 parts by weight.

The metal oxide sol as (C) component is used to form a cured coating having transparency, high surface hardness and a high refractive index. As the (C) component, an antimony oxide (Sb₂O₅) sol, a tin oxide (SnO₂) sol and titanium oxide (TiO₂) sol may be used alone or in combination.

The dispersion medium for these sols is selected from water, alcohol solvents and aromatic organic solvents. The amount of the (C) component metal oxide(s) as a dispersed phase is 0 to 130 parts by weight.

The polybasic carboxylic acid or the anhydride thereof, or the bisphenol compound as (D) component is used as a crosslinking agent for the above epoxy group-containing silicon compound or the partial hydrolysis product thereof as the (A) component and the silicon compound or the partial hydrolysis product thereof as the (B) component. Moreover, the (D) component is used to impart the cured coating with a high refractive index. The (D) component is required to be compatible with each of the components in the coating liquid.

The polybasic carboxylic acid or anhydride thereof is selected, for example, from dicarboxylic acids, tricarboxylic acids and tetracarboxylic acids. Of these, preferred are a polycyclic aromatic dicarboxylic acid or an anhydride thereof, and a polycyclic halogenated aromatic dicarboxylic acid or an anhydride thereof, such as naphthalensdicarboxylic acid, phenanthrenedicarboxylic acid, diphenyldicarboxylic acid, diphenyladipic acid (e.g. 2,4-diphenylhexane diacid) or dibenzoyltartaric acid. Further, the above polycyclic aromatic dicarboxylic acid or the anhydride thereof as the (D) component say have substituents other than halogen atoms on their benzene rings.

The above polycyclic aromatic dicarboxylic acid or anhydride thereof are preferred since a high refractive index can be obtained, as compared to other dicarboxylic acids, tricarboxylic acids and tetracarboxylic acids such as itaconic acid, succinic acid, maleic acid, citric acid, tricarballylic acid, etc., and anhydrides thereof. However, the foregoing carboxylic acids or the anhydrides thereof may be used in combination with the above polycyclic aromatic dicarboxylic acid or anhydride thereof.

The bisphenol compound as the (D) component is selected from bisphenol A, bisphenol B, thiobisphenol, etc., of the following formulae.

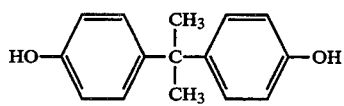

(bisphenol A type)

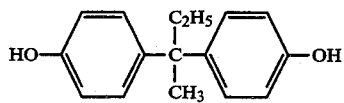

(bisphenol B type)

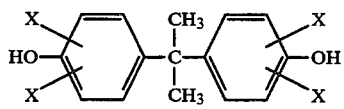

(X = Cl, Br or I)

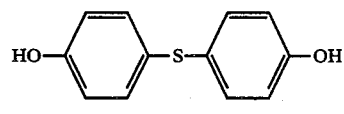

(thiobisphenol)

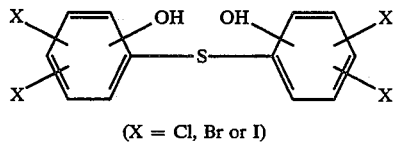

(X = Cl, Br or I)

The amount of the (D) component for use is 25 to 30 parts by weight.

The suitable weight ratio of each of antimony oxide, tin oxide and titanium oxide as a metal oxide of the (C) component to the total sum of the (A), (B) and (D) components is as shown in Table 1.

TABLE 1

| Metal oxide ((C) component/ total sum of (A), (B) and (D) components | Weight ratio |
| --- | --- |
| Sb₂O₅/total sum of (A), (B) and (D) | 5/95–65/35 |
| SnO₂/total sum of (A), (B) and (D) | 5/95–65/35 |
| TiO₂/total sum of (A), (B) and (D) | 5/95–35/65 |

The curing catalyst as (E) component is used for a coating layer forming reaction of the (A) component, the (B) component, the (C) component and the (D) component. The curing catalyst is selected, for example, from alkali metal salt or ammonium salt of a carboxylic acid, metal salt of acetyl acetone, primary, secondary and tertiary amines, polyalkylene amine, sulfonic acid salt, magnesium perchlorate, ammonium perchlorate, etc. These compounds can be used in combination with an organic mercaptan or mercaptoalkylsilane. This (E) component may be kept separate from a mixture of the other components of the composition and added to the mixture just before application of the mixture. The amount of the (E) component is 0.01 to 30 parts by weight.

As an (F) component, 0.5 to 160 parts by weight of an acid catalyst is used for hydrolysis of the silicon compounds as the above (A) and (B) components. The (F) component is selected from formic acid, chloroacetic acid, acetic acid and hydrochloric acid.

As an optional (G) component, 180 to 1,900 parts by weight of a solvent is used as a diluent for the coating liquid. The solvent is selected from alcohols, ethers, aromatic hydrocarbons, esters and ketones. When a silicon compound, which is not a partial hydrolysis product, is used as the above (A) and (B) components, the silicon compound is partially hydrolyzed with water as (G) component.

Further, as an (H) component, a leveling and/or surface-smoothing agent for a cured coating may be used, and either a copolymer of polyoxyalkylene and polydimethylsiloxane or a copolymer of polyoxyalkylene and fluorocarbon may be used. The amount of the (H) component is 0.01 to 7 parts by weight.

Furthermore, as an (I) component, 0.1 to 2 parts by weight, based on the total amount of the (A) to (E) components, of a known antioxidant and weatherabilityimparting agent may be used.

In the composition of the present invention, the mixing ratio is selected such that the cured coating has a refractive index of 1.50 to 1.63. The transparent solid material in the present invention is selected from acrylic polymers, urethane-based polymers, polycarbonate polymers and acrylcarbonate polymers, and preferred are those having a relatively high refractive index of 1.53 to 1.65. And, in the present invention, the composition and the transparent solid material as a substrate are used in such a combination that the refractive index difference between these two members is not more than 0.04, preferably not more than 0.03.

The (A) component, i.e. epoxy group-containing silicon compound or the partial hydrolysis product thereof is used as an essential component, and the (D) component is used as a crosslinking agent for the (C) component, i.e. a sol of the metal oxide, the (A) component, i.e. the epoxy group-containing silicon compound or the partial hydrolysis product thereof and the (B) component, i.e. the silicon compound or the partial hydrolysis product thereof, whereby the cured product of the above coating composition exhibits a high refractive index.

In the coating composition of the present invention, the epoxy group-containing compound giving a relatively high refractive index is used as an organic silicon compound or a partial hydrolysis product thereof; the antimony oxide sol, tin oxide sol or titania sol, any of which gives a high refractive index, is used as a metal oxide sol; and further, the polycyclic aromatic dicarboxylic acid etc. is used as a crosslinking agent for the formation of a cured coating; whereby it is made possible to obtain a cured transparent coating having a high refractive index, being free from interference fringes and having high scratch resistance.

Moreover, the cured transparent coating formed of the coating composition of the present invention further improves the use area and value of the transparent solid material in sunglasses, window glass, etc., due to its excellent dyeing properties.

EXAMPLE 1

|  | parts by weight |
|---|---|
| 3-Glycidoxypropyltrimethoxysilane | 11.02 |
| Distilled water | 2.53 |
| Glacial acetic acid | 1.67 |
| (−)-dibenzoyl-L-tartaric acid | 2.53 |
| Sodium acetate (10% aqueous solution) | 1.69 |
| Suncolloid AMT-130S (antimony pentoxide, sol, 30% $Sb_2O_5$ in methanol, supplied by Nissan Chemical Industry, Ltd.) | 60.13 |
| Dow Corning 193 (polydimethylsiloxane-polyoxyalkylene copolymer, 10% in n-butanol, supplied by Dow Corning Co.) | 0.15 |
| Ethylene glycol monomethyl ether | 20.28 |
| Total: | 100.00 |

At first, glacial acetic acid was added to distilled water, and while the resultant mixture was stirred, 3-glycidoxypropyltrimethoxysilane was added. Then, Suncolloid AMT-130S and ethylene glycol monomethyl ether were added, and the resultant mixture was fully stirred.

Further, (−)-dibenzoyl-L-tartaric acid was added, and the resultant mixture was fully stirred until a homogeneous mixture was formed. Sodium acetate was gradually added to the homogeneous mixture, and the resultant mixture was fully stirred. Dow Corning 193 was further added, and the resultant mixture was fully stirred, whereby a coating liquid was obtained.

The method for applying the above coating liquid, and the physical property data of the resultant cured coating will be described later, which will be also the case with the following Examples and Comparative Example.

EXAMPLE 2

|  | part by weight |
|---|---|
| 3-Glycidoxypropyltrimethoxysilane | 13.2 |
| Suncolloid T-300 (tin oxide sol, 33% nonvolatile content in water, supplied by Nissan Chemical Industry, Ltd.) | 28.1 |
| 2,2′-Biphenyldicarboxylic acid | 5.5 |
| Benzyldimethylamine | 0.9 |
| Distilled water | 13.4 |
| Dow Corning 190 (polydimethylsiloxane-polyoxyalkylene copolymer, 10% in n-butanol, supplied by Dow Corning Co.) | 0.1 |
| Propylene glycol monomethyl ether | 38.8 |
| Total: | 100.0 |

3-Glycidoxypropyltrimethoxysilane was added to Suncolloid T-300, and the resultant mixture was fully stirred. Then, distilled water and propylene glycol monomethyl ether were added to the mixture, and the mixture was fully stirred. Further, 2,2′-biphenyldicarboxylic acid was added, and the resultant mixture was fully stirred until a homogeneous mixture was formed. Benzyldimethylamine was added to the homogeneous mixture, and the resultant mixture was fully stirred. Dow Corning 190 was further added, and the resultant mixture was fully stirred.

EXAMPLE 3

|  | part by weight |
|---|---|
| Tetraisopropyl titanate | 13.91 |
| Glacial acetic acid | 27.89 |
| Distilled water | 23.20 |
| 2-(3,4-Epoxycyclohexyl)-ethyltrimethoxysilane | 17.52 |
| 4,4′-biphenyldicarboxylic acid | 4.03 |
| N,N,N′,N″,N″-Pentamethyldiethylenetriamine | 2.70 |
| Dow Corning 190 (polydimethylsiloxane-polyoxyalkylene copolymer, 10% in n-butanol, supplied by Dow Corning Co.) | 0.10 |
| Ethylene glycol monoethyl ether | 10.65 |
| Total: | 100.00 |

At first, glacial acetic acid and distilled water were added to tetraisopropyl titanate, and the resultant mixture was fully stirred. 2-(3,4-Epoxycyclohexyl)ethyltrimethoxysilane was added thereto, and the resultant mixture was fully stirred. Further, ethylene glycol monoethyl ether was added, and the resultant mixture was fully stirred. Further, 4,4′-biphenyldicarboxylic acid was added, and the resultant mixture was fully stirred until a homogeneous mixture was formed N,N,N′,N″,N″-pentamethyldiethylenetriamine was added to the homogeneous mixture, and the resultant mixture was fully stirred. Dow Corning 190 was further added, and the resultant mixture was fully stirred.

EXAMPLE 4

|  | part by weight |
|---|---|
| 3-Glycidoxypropyltrimethoxysilane | 16.37 |

-continued

| | part by weight |
|---|---|
| Distilled water | 3.73 |
| Glacial acetic acid | 0.41 |
| Itaconic acid | 3.69 |
| Sodium acetate (10% aqueous solution) | 1.11 |
| Suncolloid AMT-130S | 45.35 |
| Dow Corning 193 (polydimethylsiloxane-polyoxyalkylene copolymer, 10% in n-butanol, supplied by Dow Corning Co.) | 0.45 |
| Ethylene glycol monomethyl ether | 28.89 |
| Total: | 100.00 |

Glacial acetic acid was added to distilled water, and while the resultant mixture was stirred, 3-glycidoxypropyltrimethoxysilane was added. Then, Suncolloid AMT-130S and ethylene glycol monomethyl ether were added, and the resultant mixture was fully stirred. Further, itaconic acid was added, and the resultant mixture was fully stirred until a homogeneous mixture was formed. Sodium acetate was gradually added to the homogeneous mixture, and the resultant mixture was fully stirred. Dow Corning 193 was further added, and the resultant mixture was fully stirred.

EXAMPLE 5

| | part by weight |
|---|---|
| 3-Glycidoxypropyltrimethoxysilane | 12.50 |
| Methyltrimethoxysilane | 4.40 |
| Distilled water | 2.51 |
| Glacial acetic acid | 0.36 |
| 2,2'-Biphenyldicarboxylic acid | 3.59 |
| Sodium acetate (10% aqueous solution) | 2.39 |
| Suncolloid AMT-130S | 43.21 |
| Dow Corning 190 (10% in n-butanol) | 0.15 |
| Ethylene glycol monoethyl ether | 30.89 |
| Total: | 100.00 |

Glacial acetic acid was added to distilled water, and while the resultant mixture was stirred, 3-glycidoxypropyltrimethoxysilane and methyltrimethoxysilane were added. Then, Suncolloid AMT-130S and ethylene glycol monomethyl ether were added, and the resultant mixture was fully stirred. 2,2'-Biphenyldicarboxylic acid was further added, and the resultant mixture was fully stirred until a homogeneous mixture was formed. Sodium acetate was gradually added to the homogeneous mixture. And, Dow Corning 190 as further added, and the resultant mixture was fully stirred.

EXAMPLE 6

| | part by weight |
|---|---|
| 3-Glycidoxypropyltrimethoxysilane | 16.0 |
| Distilled water | 3.7 |
| Glacial acetic acid | 0.4 |
| 2,2'-bis(4-hydroxyphenyl)propane (bisphenol A) | 3.7 |
| Ammonium perchlorate (10% aqueous solution) | 0.4 |
| Suncolloid AMT-130S | 50.0 |
| Dow Corning 190 (10% in n-butanol) | 0.4 |
| Isopropyl alcohol | 25.4 |
| Total: | 100.00 |

Glacial acetic acid was added to distilled water, and while the resultant mixture was stirred, 3-glycidoxypropyltrimethoxysilane was added. Then, Suncolloid AMT-130S and isopropyl alcohol were added, and the resultant mixture was fully stirred. Further, bisphenol A was added, and the resultant mixture was fully stirred until a homogeneous mixture was formed. An ammonium perchlorate aqueous solution and Dow Corning 190 were added, and the resultant mixture was fully stirred.

EXAMPLE 7

| | part by weight |
|---|---|
| 3-Glycidoxypropyltrimethoxysilane | 27.5 |
| Distilled water | 6.3 |
| Glacial acetic acid | 0.6 |
| 4,4'-Biphenyldicarboxylic acid | 6.3 |
| Dibenzylamine | 4.2 |
| Dow Corning 190 (10% in n-butanol) | 0.4 |
| Ethylene glycol monoethyl ether | 54.7 |
| Total: | 100.00 |

Glacial acetic acid was added to distilled mater, and while the resultant mixture was stirred, 3-glycidoxypropyltrimethoxysilane was added. Then, ethylene glycol monomethyl ether was added, and the resultant mixture was fully stirred. Further, 4,4'-biphenyldicarboxylic acid was added, and the resultant mixture was fully stirred until a homogeneous mixture was formed. Dibenzylamine was gradually added, and the resultant mixture was fully stirred. Dow Corning 190 was further added, and the resultant mixture was fully stirred.

EXAMPLE 8

| | part by weight |
|---|---|
| 3-Glycidoxypropyltrimethoxysilane | 32.0 |
| Distilled water | 7.4 |
| Glacial acetic acid | 0.8 |
| 2,2'-bis(4-Hydroxyphenyl)propane (bisphenol A) | 7.4 |
| Magnesium perchlorate (10% aqueous solution) | 0.6 |
| Dow Corning 190 (10% in n-butanol) | 0.4 |
| Isopropyl alcohol | 51.4 |
| Total: | 100.00 |

Glacial acetic acid was added to distilled water, and while the resultant mixture was stirred, 3-glycidoxypropyltrimethoxysilane was added. Then, isopropyl alcohol was added, and the resultant mixture was fully stirred. Further, bisphenol A was added, and the resultant mixture was fully stirred until a homogeneous mixture was formed. A magnesium perchlorate aqueous solution and Dow Corning 190 were added to form a homogeneous mixture.

Comparative Example

| | part by weight |
|---|---|
| 3-Glycidoxypropyltrimethoxysilane | 9.8 |
| Methyltrimethoxysilane | 13.0 |
| Glacial acetic acid | 1.4 |
| Itaconic acid | 2.4 |
| Nalcoag 1041 (silica sol, 35% solid content in water, supplied by Nalco Chemical Co.) | 47.4 |
| Acetylacetone aluminum salt | 1.1 |
| Ethylene glycol monomethyl ether | 24.9 |
| Total: | 100.00 |

Glacial acetic acid was added to a dispersion of silica sol in water, and while the resultant mixture was stirred, 3-glycidoxypropyltrimethoxysilane and methyltrimethoxysilane were added. Then, half of ethylene glycol monoethyl ether was added. Thereafter, itaconic acid was added, and the resultant mixture was fully mixed until a homogeneous mixture was formed. Acetylacetone aluminum salt was dissolved in the remaining half of the ethylene glycol monoethyl ether, and this mixture was added to the above homogeneous mixture. And, the resultant mixture was fully stirred.

Application to Lens and Performance of Coating (1) Substrate Having High Refractive Index i) Lens substrate A A liquid mixture containing 20 parts by weight of 2-chlorophenylmaleimide, 20 parts by weight of 2,2-bis(3,5dibromo-4-methacryloyloxyethoxyphenyl)propane, 30 parts by weight of tribromophenyl methacrylate, 25 parts by weight of diallyl isophthalate, 5 parts by weight of tertraethylene glycol dimethacrylate, 1 part by weight of 2-(2′-hydroxy-3′,5′-di-tert-butylphenyl)-5-chlorobenzotriazole as an ultraviolet light absorber and 2 parts by weight of t-butylperoxy(2-ethylhexanoate) as a radical polymerization initiator was molded according to a conventional method (Nd=1.595).

ii) Lens substrate B

Lenses were prepared by molding MR-6 (urethane-based polymer giving a high refractive index) supplied by Mitsui Toatsu Chemicals Inc. (Nd=1.594).

(2) Method for Application of Coating Liquids i) The lens substrates A and B were immersed in an 8% NaOH aqueous solution for 30 minutes, fully washed with water and dried.

ii) Each of the coating liquids was dip-coated on the substrates at a take-up rate of 25 cm/minute.

iii) The substrates were dried at room temperature for about 20 minutes, and cured under heat at 120° C. for 60 minutes.

(3) Method for Measurement of Refractive Index

Measured with an Abbe refractometer according to a conventional method.

(4) Method for Measurement of Coating Thickness

Measured with a spectrophotometer according to a conventional method.

(5) Crosshatch Test

Carried out according to a crosscut adhesion test JIS K5400.

(6) Steel Wool Test

Coating samples were rubbed with a steel wool #0000 for relative comparison.

Table 2 shows the results of the performance tests of the above coatings.

TABLE 2

| | Lens substrate | Coating thickness (μm) | Refractive index (Nd) | Interference fringes | Crosshatch | Steel wool |
|---|---|---|---|---|---|---|
| Example 1 | A | 4.5 | 1.58 | ○ | 100/100 | a |
| | B | 4.5 | | ○ | " | |
| Example 2 | A | 4.0 | 1.59 | ○ | " | a |
| | B | 4.0 | | ○ | " | |
| Example 3 | A | 4.3 | 1.58 | ○ | " | b |
| | B | 4.3 | | ○ | " | |
| Example 4 | A | 4.0 | 1.56 | Δ | " | a |
| | B | 4.0 | | Δ | " | |
| Example 5 | A | 4.4 | 1.57 | ○-Δ | " | a |
| | B | 4.4 | | ○-Δ | " | |
| Example 6 | A | 4.2 | 1.57 | ○-Δ | " | a |
| | B | 4.2 | | ○-Δ | " | |
| Example 7 | A | 4.4 | 1.56 | Δ | " | b |
| | B | 4.4 | | Δ | " | |
| Example 8 | A | 4.3 | 1.55 | Δ | " | b |
| | B | 4.3 | | Δ | " | |
| Comparative Example | A | 4.5 | 1.47 | x | " | a |
| | B | 4.5 | | x | " | |

Evaluation on interference fringes:
○: not observed
○-Δ: observed considerably slightly
Δ: observed slightly
x: observed clearly
Evaluation with steel wool
a: excellent
b: inferior to a to some extent In addition, the coating liquid obtained in Example 4 was coated on a lens substrate B and cured by the foregoing method, and the resultant lens was examined to determine its dyeing properties by the following procedure. A 1% aqueous solution of BPI Sun Brown was heated to 90° C., and the above lens was immersed in this solution for 10 minutes, taken out and washed with water. The lens shoved 35% transmittance of visible light and sufficient dyeing properties.

What is claimed is:

1. A scratch-resistant coating composition capable of forming a coating having a high refractive index on a transparent solid material, the coating composition comprising the following components:

(A) 100 parts by weight of an epoxy group-containing silicon compound of the formula:

$R^1R^2{}_nSi(OR^3)_{3-n}$ wherein $R^1$ is an epoxy-containing group having 2 to 12 carbon atoms, $R^2$ is an alkyl, alkenyl, or halogenated alkyl group having 1 to 6 carbon atoms or a halogenated aryl group, $R^3$ is a hydrogen atom or an alkyl, acyl or alkylacyl group having 1 to 4 carbon atoms, and n is an integer of 0 to 2, or a partial hydrolysis product thereof, (B) 0 to 100 parts by weight of an organosilicon compound of formula:

$R^4{}_pR^2{}_q\text{Si}(OR^3)_{4-p-q}$ wherein $R^2$ and $R^3$ are as defined above, $R^4$ is an alkyl or halogenated alkyl group having 1 to 4 carbon atoms, an aryl or halogenated aryl group having 6 to 12 carbon atoms, a methacryloxyalkylene group having 5 to 8 carbon atoms, or a ureidoalkylene, aromatic ureidoalkylene, halogenated aromatic alkylene or a mercaptoalkylene group having 2 to 10 carbon atoms, p is an integer of 1 to 3 and q is an integer of 0 to 2,
or a partial hydrolysis product thereof,
(C) 0 to 130 parts by weight of at least one metal oxide selected from the group consisting of antimony oxide, tin oxide and titanium oxide, said metal oxide being in the form of a sol,
(D) 0.25 to 30 parts by weight of a bisphenol compound, and
(E) 0.01 to 30 parts by weight of a curing catalyst.

2. A molded article formed by coating a transparent solid substrate with the coating composition of claim 1.

3. A scratch-resistant coating composition capable of forming a coating having a high refractive index on a transparent solid material, said coating composition comprising:
(A) 100 parts by weight of an epoxy group-containing silicon compound of the general formula:

$R^1R^2{}_n\text{Si}(OR^3)_{3-n}$ wherein $R^1$ is an epoxy-containing group having 2 to 12 carbon atoms, $R^2$ is an alkyl, alkenyl or halogenated alkyl group having 1 to 6 carbon atoms or a halogenated aryl group, $R^3$ is a hydrogen atom or an alkyl, acyl or alkylacyl group having 1 to 4 carbon atoms, and n is an integer of 0 to 2, or a partial hydrolysis product thereof,
(B) 0 to 100 parts by weight of an organosilicon compound of the general formula:

$R^4{}_pR^2{}_q\text{Si}(OR^3)_{4-p-q}$ wherein $R^2$ and $R^3$ are as defined above for (A), $R^4$ is an alkyl or halogenated alkyl group having 1 to 4 carbon atoms, an aryl or halogenated aryl group having 6 to 12 carbon atoms, a methacryloxyalkylene group having 5 to 8 carbon atoms, or a ureidoalkylene, aromatic ureidoalkylene, halogenated aromatic alkylene or a mercaptoalkylene group having 2 to 10 carbon atoms, p is an integer of 1 to 3 and q is an integer of 0 to 2, or a partial hydrolysis product thereof,
(C) 0 to 130 parts by weight of at least one metal oxide selected from the group consisting of antimony oxide, tin oxide and titanium oxide, said metal oxide being in the form of a sol,
(D) 0.25 to 30 parts by weight of a cross-linking agent for (A), said cross-linking agent being a bisphenol compound; and
(E) 0.01 to 30 parts by weight of a curing catalyst, said composition containing no metal oxide other than (C).

4. A scratch-resistant coating composition in accordance with claim 3 wherein said bisphenol compound is a halogenated bisphenol compound of the following formula:

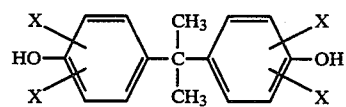

wherein X is Cl, Br or I.

5. A scratch-resistant coating composition in accordance with claim 1 wherein said bisphenol compound is a halogenated bisphenol compound of the following formula:

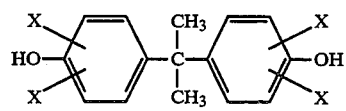

wherein X is Cl, Br or I.

* * * * *

UNITED STATES PATENT AND TRADEMARK OFFICE
CERTIFICATE OF CORRECTION

PATENT NO. : 5,367,019
DATED : November 22, 1994
INVENTOR(S) : Fujio SAWARAGI

It is certified that error appears in the above-indentified patent and that said Letters Patent is hereby corrected as shown below:

Col. 1, line 9, delete "Sept. 2, 1991" and insert --Sept. 2, 1992--.

Col. 2, line 5, after "layer" insert a comma --,--.

Col. 3, line 33, delete "say" insert --may--.

Col. 8, line 19, delete "mater" insert --water--.

Col. 10, line 48, delete "shoved" insert --showed--.

Signed and Sealed this

First Day of August, 1995

Attest:

BRUCE LEHMAN

Attesting Officer

Commissioner of Patents and Trademarks